(12) United States Patent
Agarwal et al.

(10) Patent No.: US 7,120,451 B2
(45) Date of Patent: Oct. 10, 2006

(54) METHOD FOR OPTIMIZING HOME LOCATION REGISTER QUERIES IN A WIRELESS COMMUNICATION SYSTEM

(75) Inventors: Anjana Agarwal, Wheaton, IL (US); John Matthew Gafrick, Naperville, IL (US); Mark Alan McCormick, Naperville, IL (US); Kimberly Sue Tomasko-Dean, LaGrange, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 367 days.

(21) Appl. No.: 10/325,312

(22) Filed: Dec. 20, 2002

(65) Prior Publication Data

US 2004/0203758 A1    Oct. 14, 2004

(51) Int. Cl.
*H04Q 7/20* (2006.01)
(52) U.S. Cl. ............... 455/456.2; 455/433; 455/456.1; 455/404.2; 455/456.5; 455/461; 455/435.1
(58) Field of Classification Search ................ 455/413, 455/412.2, 158.3, 433, 435.1, 435.2, 432.2, 455/551, 461, 456.2, 456.1, 456.5, 404.2
See application file for complete search history.

(56) References Cited

U.S. PATENT DOCUMENTS 5,854,982 A * 12/1998 Chambers et al. .......... 455/445
5,878,348 A * 3/1999 Foti ........................... 455/434
5,956,637 A * 9/1999 Ericsson et al. .......... 455/432.3
6,064,887 A * 5/2000 Kallioniemi et al. ....... 455/445
6,138,017 A * 10/2000 Price et al. ................. 455/433
6,144,857 A * 11/2000 Price et al. ................. 455/445
6,160,804 A * 12/2000 Ahmed et al. .............. 370/349
6,611,684 B1 * 8/2003 Franks ....................... 455/433
6,643,511 B1 * 11/2003 Rune et al. ................. 455/433
6,697,621 B1 * 2/2004 Taha et al. .................. 455/433
6,832,089 B1 * 12/2004 Jean Henry-Labordere . 455/445
2004/0224682 A1 * 11/2004 Kang ......................... 455/433

FOREIGN PATENT DOCUMENTS

EP    0817522 A2    6/1997
EP    0923257 A2    12/1998

* cited by examiner

*Primary Examiner*—George Eng
*Assistant Examiner*—Huy Phan
(74) *Attorney, Agent, or Firm*—John B. MacIntyre

(57) ABSTRACT

When a subscriber record is moved from a first HLR to a second HLR that utilizes a different protocol, the wireless communication system sends two queries for location information for the mobile station, one to the first HLR and one to the second HLR, simultaneously. Two responses are received, one from each of the HLRs. The valid response is recorded in a separate table for future use. The invalid response is discarded. The next time a call comes in for the mobile station, the table is traversed to determine if the HLR has been updated for the mobile station. If so, the location request is sent only to the system in the table. If the table does not include information for the called mobile station, simultaneous queries are sent to the first and second HLRs.

8 Claims, 4 Drawing Sheets

FIG. 5

| DIRECTORY NUMBER | PRIMARY HLR | SECONDARY HLR |
|---|---|---|
| (630) 555-1111 | HLR2 (GSM) | HLR1 (ANSI-41) |
| (630) 555-2222 | HLR2 (GSM) | HLR1 (ANSI-41) |
| (630) 555-3333 | HLR1 (ANSI-41) | HLR2 (GSM) |
| (630) 555-9999 | HLR1 (ANSI-41) | HLR2 (GSM) |

FIG. 6

| DIRECTORY NUMBER | UPDATED HLR |
|---|---|
| (630) 555-1111 | HLR1 (ANSI-41) |
| (630) 555-2222 | NULL |
| (630) 555-3333 | HLR2 (GSM) |
| (630) 555-9999 | NULL |

METHOD FOR OPTIMIZING HOME LOCATION REGISTER QUERIES IN A WIRELESS COMMUNICATION SYSTEM

FIELD OF THE INVENTION

This invention relates generally to the field of communication systems, and more particularly to a method of finding and communicating with a mobile station in a wireless communication system.

BACKGROUND OF THE INVENTION

Mobile users are typically registered with a home wireless communication system. The home wireless communication system includes a database that contains all the subscribers within the home service area of the home wireless communication system. This database is commonly referred to as a Home Location Register (HLR).

HLRs are capable of conversing in a particular protocol. In typical wireless communication systems, an HLR is only capable of conversing in a single protocol.

Cellular service providers allow mobile users to cross between systems using different protocols. However, HLRs will typically converse in one protocol and ignore messages in any other protocol. This can lead to problems when a mobile user roams from their home coverage area to a coverage area that utilizes a different protocol than their home wireless communication system. This can make determining the location of a mobile station or the delivery of calls to a mobile station difficult or impossible.

Wireless service providers have occasion to move subscriber records from a first HLR to a second HLR that converses in a different protocol than the first protocol. When a call request is received for the mobile station, the wireless communication system requests location information relating to the called mobile station from the first HLR. If the subscriber record is not found in the first HLR because it has been moved, the HLR sends a return error message. The return error message will typically include an unassigned directory number for the called mobile station.

The wireless communication system then sends a location request for the called mobile station to the second HLR. If the second HLR includes a subscriber record for the called mobile station, the wireless communication system utilizes the information from the second HLR.

One problem with this scenario is that the information obtained is not remembered by the wireless communication system. Every time a call for a mobile station is received the same, processor-intensive processing occurs.

Therefore, a need exists for a method that allows a service provider to move subscriber records from one HLR to another that utilizes a different protocol without wasting system resources each time a call is received for the moved mobile station. Further, a need exists for a method that allows a wireless communication system to return location information relating to a mobile station whose subscriber record has been moved in a shorter amount of time.

BRIEF SUMMARY OF THE INVENTION

The present invention provides a method for optimizing home location register (HLR) queries in a wireless communication system. When a subscriber record has been moved from a first HLR to a second HLR that utilizes a different protocol than the first HLR, the wireless communication system sends two queries for location information for the mobile station, one to the first HLR and one to the second HLR, simultaneously. Two responses will be received, one from each of the HLRs. The valid response is recorded in a separate table for future use. The invalid response is discarded.

The next time a call comes in for mobile station, the update table is traversed to determine if the HLR of the mobile station has been updated. If so, the location request is sent only to the system in the table. If the table does not include information for the called mobile station, simultaneous queries are sent to the first and second HLRs, as described above, and the same process is followed.

The present invention thereby provides a method that allows a service provider to move subscriber records from one HLR to another that utilizes a different protocol without wasting system resources each time a call is received for the moved mobile station. Once the moved subscriber record has been found, this information is stored in the wireless communication system so that the sending of multiple simultaneous queries is no longer necessary. This saves on system resources and minimizes traffic in the wireless communication system. Further, the present invention provides a method that allows a wireless communication system to return location information relating to a mobile station whose subscriber record has been moved with a better response time.

BRIEF DESCRIPTION OF THE SEVERAL VIEWS OF THE DRAWINGS

FIG. 5 depicts a table of directory numbers and associated primary HLR and secondary HLR in accordance with an exemplary embodiment of the present invention.

FIG. 6 depicts an update table of directory numbers and associated updated HLR in accordance with an exemplary embodiment of the present invention.

DETAILED DESCRIPTION OF THE INVENTION

Figure 1:
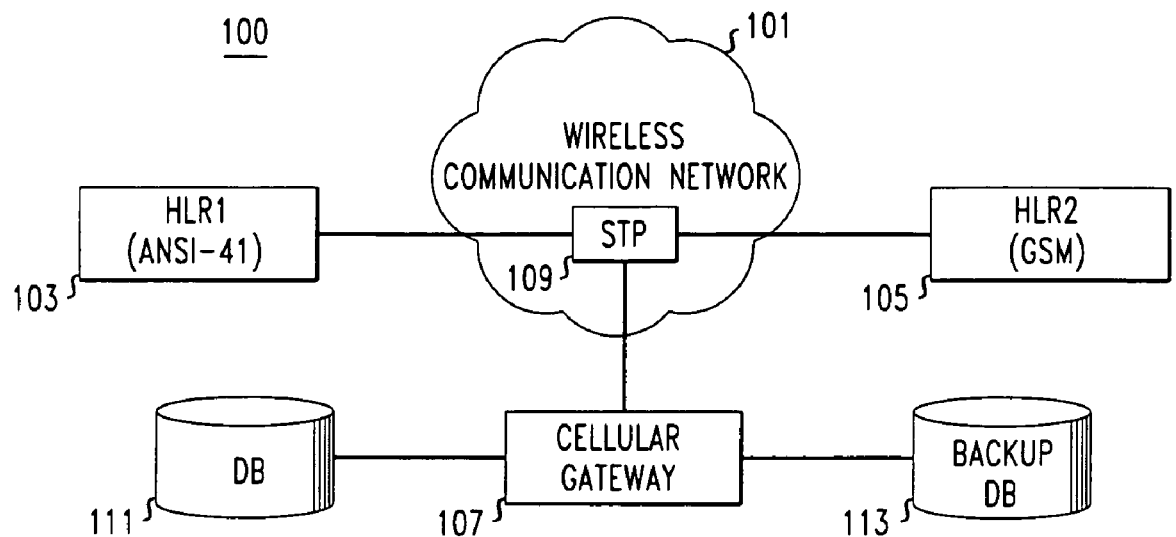
FIG. 1 depicts a wireless communication system in accordance with an exemplary embodiment of the present invention.

FIG. 1 depicts a wireless communication system 100 in accordance with an exemplary embodiment of the present invention. Wireless communication system 100 includes wireless communication network 101, home location register (HLR) HLR1 103, home location register HLR2 105, cellular gateway 107, signal transfer point (STP) 109, database 111, and backup database 113. Wireless communication network 101 comprises functions necessary to operate and maintain wireless communications with mobile stations (not shown). Wireless communication network 101 can be based on any well-known technology, such as analog or digital.

HLR1 103 and HLR2 105 are both home location registers. A home location register is a database in a cellular system that includes all the subscribers within the home service area of the cellular service provider. In the embodiment depicted in FIG. 1, HLR1 103 utilizes the American National Standards Institute (ANSI) ANSI-41 protocol titled "Cellular Radiotelecommunications Intersystem Operations." In the embodiment depicted in FIG. 1, HLR2 105 utilizes the Global System for Mobile Communications (GSM) protocol. HLR1 103 and HLR2 105 are preferably not able to communicate in a protocol that is different than their own.

Although only two HLRs are depicted in FIG. 1, it should be understood that the present invention works with any number of HLRs utilizing the methods and concepts described in accordance with the exemplary embodiment of FIG. 1. Further, although only ANSI-41 and GSM protocols are depicted, it should be understood that the present invention works with HLRs utilizing a variety of protocols. In addition, the present invention also applies to HLRs that are using the same protocol that may not be compatible due to changes in versions of the protocol. For example, an updated GSM protocol may not be compatible with an earlier GSM protocol, and the present invention would work in this scenario as well.

Cellular gateway 107 is an entrance into wireless communication network 101. Cellular gateway 107 is responsible for determining the location of mobile stations within communication system 100. Cellular gateway 107 accomplishes location determination by interfacing with HLRs, such as HLR1 103 and HLR2 105.

Signal transfer point (STP) 109 is a node within wireless communication network 101 that routes messages between cellular gateway 107 and HLR1 103 and HLR2 105.

Database 111 and backup database 113 are data storage mechanisms that are capable of storing data and receiving and sending data to and from cellular gateway 107. As depicted in FIG. 1, database 111 and backup database 113 are depicted as two separate physical databases, but they can also be separate logical databases within one physical database. In an exemplary embodiment, database 111 stores table 500, which is depicted in FIG. 5, and backup database 113 stores update table 600, which is depicted in FIG. 6.

Figure 2:
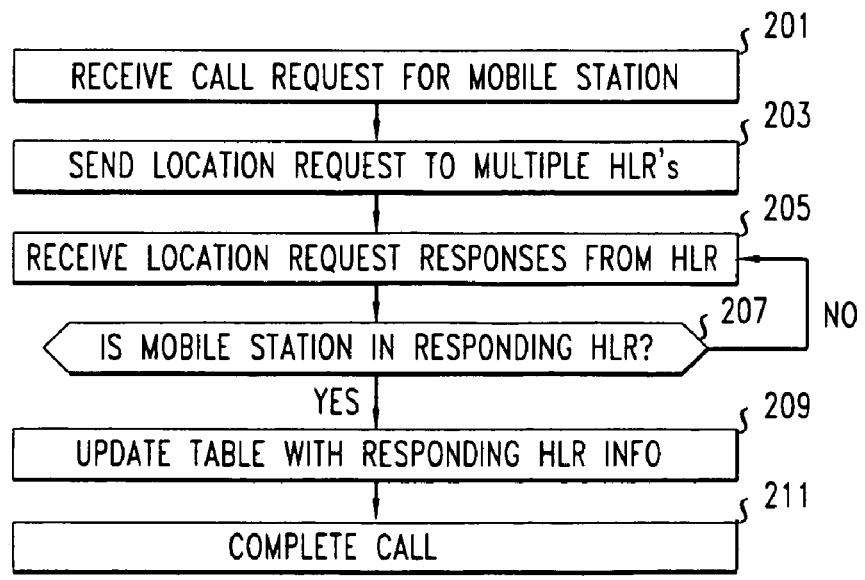
FIG. 2 depicts a flowchart of a method for sending a location request to multiple HLRs in accordance with an exemplary embodiment of the present invention.

FIG. 2 depicts a flowchart 200 of a method for sending a location request to multiple HLRs in accordance with an exemplary embodiment of the present invention.

Wireless communication network 101 receives (201) a location request for a mobile station. The location request, such as a call request, is a request to locate a mobile station. The location request can originate from a wireline or wireless communication network.

Wireless communication network 101 sends (203) a location request message to a plurality of HLRs. The location request message goes from cellular gateway 107 through wireless communication network 101 via STP 109 to HLR1 103 and HLR2 105.

Wireless communication network 101 receives (205) a location request response from each of the plurality of HLRs. The location request responses should arrive at approximately the same time, and the timing of arrival will depend upon communication lag, processor speed, and other factors. The location request response includes a directory number (DN).

Wireless communication system determines (207) if the mobile station is in the responding HLR. If the DN in the location request response is unassigned, the wireless communication system knows that the mobile station is not currently located at the HLR that sent the location request response. If the mobile station is not at the HLR, wireless communication network 101 returns to step 205 to receive location request responses from the plurality of HLRs. If all HLRs respond with an unassigned DN, or if a timeout timer expires, an announcement will be played to the caller and the call attempt will be ended. If the mobile station is in the responding HLR, wireless communication system updates (209) an update table with information received from the responding HLR.

Wireless communication network 101 completes (211) the call to the mobile station in the responding HLR.

Figure 3:
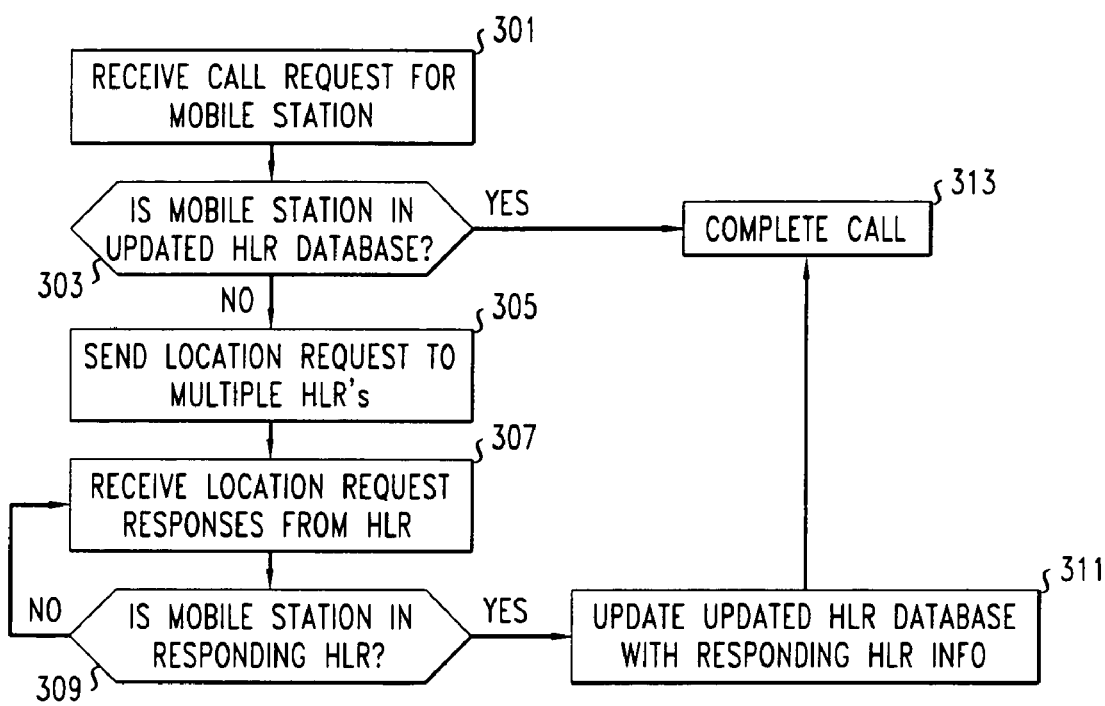
FIG. 3 depicts a flowchart of a method for sending a location request to a backup HLR in accordance with an exemplary embodiment of the present invention.

FIG. 3 depicts a flowchart 300 of a method for sending a location request to an updated HLR in accordance with an exemplary embodiment of the present invention.

Wireless communication network 101 receives (301) a location request for a mobile station. The location request, such as a call request, is a request to locate a mobile station. The location request can originate from a wireline or wireless communication network.

Wireless communication network 101 checks an update table, which is depicted in FIG. 6, and determines (303) if a record for the called mobile station includes an updated HLR. If so, wireless communication network 101 completes (313) the call by connecting the caller with the mobile station at the stored HLR.

If the backup HLR does not include an updated HLR for the called mobile station, wireless communication network 101 sends (305) a location request message to a plurality of HLRs. Wireless communication network 101 sends (203) the location request message goes from cellular gateway 107 through wireless communication network 101 via STP 109 to HLR1 103 and HLR2 105. The process at this point is similar to that depicted in FIG. 2.

Wireless communication network 101 receives (307) a location request response from each of the plurality of HLRs. The location request responses should arrive at approximately the same time, and the timing of arrival will depend upon communication lag, processor speed, and other factors. The location request response includes a directory number (DN).

Wireless communication system determines (309) if the mobile station is in the responding HLR. If the DN in the location request response is unassigned, the wireless communication system knows that the mobile station is not currently located at the HLR that sent the location request response. If the mobile station is not at the HLR, wireless communication network 101 returns to step 307 to receive location request responses from the plurality of HLRs. If all HLRs respond with an unassigned DN, or if a timeout timer expires, an announcement will be played to the caller and the call attempt will be ended. If the mobile station is in the responding HLR, wireless communication system updates (311) an update table with information received from the responding HLR.

Wireless communication network 101 completes (313) the call to the mobile station in the responding HLR.

Figure 4:
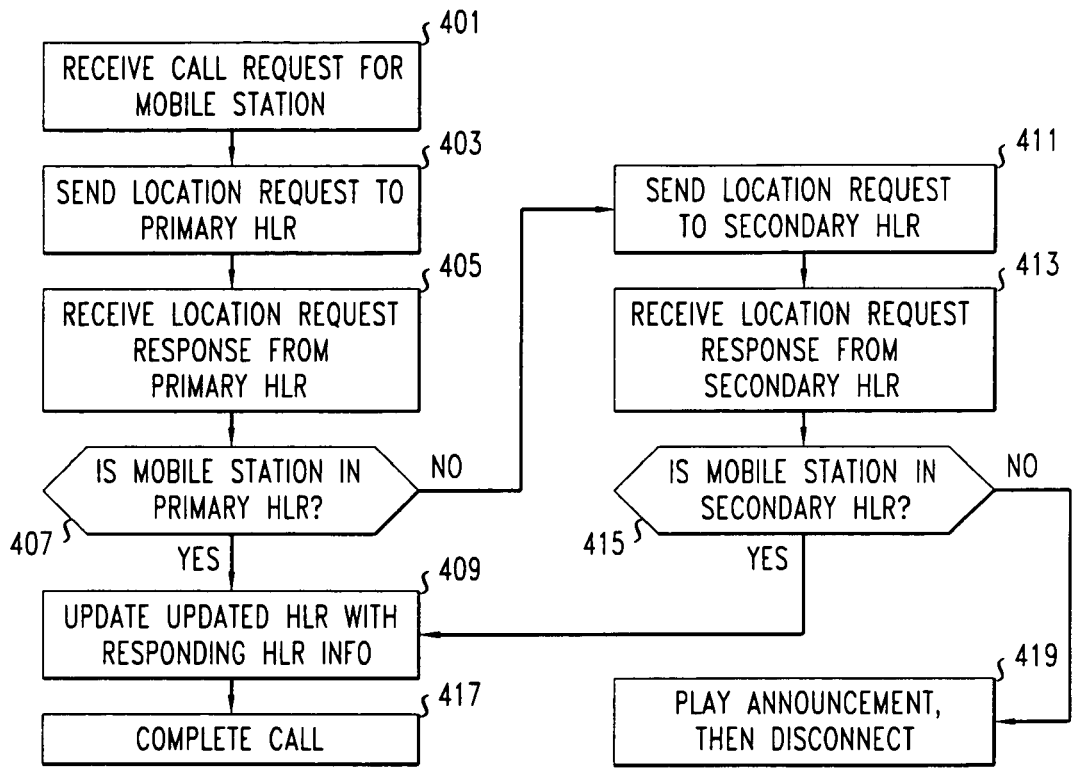
FIG. 4 depicts a flowchart of a method for sending a location request to an HLR and updating a update table in accordance with an exemplary embodiment of the present invention.

FIG. 4 depicts a flowchart 400 of a method for sending a location request to an HLR and updating a backup HLR in accordance with an exemplary embodiment of the present invention.

Wireless communication network 101 receives (401) a location request for a mobile station. The location request, such as a call request, is a request to locate a mobile station. The location request can originate from a wireline or wireless communication network.

Wireless communication network 101 sends (403) a location request to a primary HLR. The location request message goes from cellular gateway 107 through wireless communication network 101 via STP 109 to HLR1 103.

Wireless communication network 101 receives (405) a location request response from the primary HLR.

Wireless communication network 101 determines (407) if the mobile station is in the primary HLR. If the DN in the location request response is unassigned, the wireless communication system knows that the mobile station is not currently located at the primary HLR. If the mobile station is not at the primary HLR, wireless communication network 101 sends (411) a location request to a secondary HLR. Wireless communication network 101 receives (413) a location request response from the secondary HLR. Wireless communication network 101 determines (415) if the mobile station is in the secondary HLR, preferably by checking if the DN field is unassigned. If the mobile station is not at the secondary HLR, wireless communication network 101 plays (419) an announcement and disconnects the caller.

If the mobile station is in the primary HLR as determined at step 407 or in the secondary HLR as determined at step 415, wireless communication network 101 updates (409) an update table with information received from the responding HLR.

Wireless communication network 101 completes (417) the call with the mobile station.

FIG. 5 depicts a table 500 of directory numbers 501 and associated primary HLR 503 and secondary HLR 505 in accordance with an exemplary embodiment of the present invention.

Directory number column 501 includes a plurality of entries for directory numbers. In the embodiment depicted in FIG. 5, directory number column 501 includes four rows, 507, 509, 511, and 513. Each row include an entry for directory number, the primary HLR, and the secondary HLR.

As depicted in FIG. 5, row 507 includes a directory number of (630) 555-1111. The primary HLR for the mobile station associated with this directory number is HLR2, which is a GSM HLR. The second HLR for this mobile station is HLR1, which is an ANSI-41 HLR.

When sending a message to multiple HLRs, as shown in the embodiments depicted in FIGS. 2 and 3, the multiple HLRs will be those stored in table 500.

FIG. 6 depicts an update table 600 of directory numbers and associated updated HLR in accordance with an exemplary embodiment of the present invention. Table 600 includes directory number column 601 and updated HLR column 603.

Directory number column 601 includes a plurality of entries for directory numbers. In the embodiment depicted in FIG. 6, table 600 includes four rows, 607, 609, 611, and 613. Each row include an entry for directory number and an entry for the updated HLR.

As depicted in FIG. 6, row 607 includes a directory number of (630) 555-1111. The updated HLR for the mobile station associated with this directory number is HLR1, which is an ANSI-41 HLR. Rows 609 and 613 include an updated HLR value of NULL, which indicates that the associated directory numbers do not have an updated HLR value currently associated with them.

The present invention thereby provides a method optimizing home location register (HLR) queries in a wireless communication system. By performing simultaneous HLR queries, system response time is improved. By storing an updated HLR for a mobile station, further response time improvements are achieved. Further, the present invention allows the storing of an updated HLR, thereby eliminating the need to send multiple query messages, thereby decreasing system traffic and conserving bandwidth.

The present invention thereby provides a method that allows a service provider to move subscriber records from one HLR to another that utilizes a different protocol. By storing the updated HLR, the sending of multiple simultaneous queries is no longer necessary. This saves on system resources and minimizes traffic in the wireless communication system.

While this invention has been described in terms of certain examples thereof, it is not intended that it be limited to the above description, but rather only to the extent set forth in the claims that follow.

We claim:

1. A method for optimizing home location register (HLR) queries in a wireless communication system, the method comprising:
    receiving a location request for a mobile station;
    simultaneously sending the location request to a plurality of HLRs;
    receiving a location request response from each of the plurality of HLRs;
    determining if the mobile station is in the responding HLR; and
    if the mobile station is in the responding HLR, updating an update table with information received from the responding HLR.

2. A method for optimizing home location register (HLR) queries in a wireless communication system in accordance with claim 1, wherein the step of receiving a location request for a mobile station comprises receiving a call request.

3. A method for optimizing home location register (HLR) queries in a wireless communication system in accordance with claim 1, wherein the step of receiving a location request response from each of the plurality of HLRs comprises receiving the location request responses at approximately the same time.

4. A method for optimizing home location register (HLR) queries in a wireless communication system in accordance with claim 1, wherein the location request response includes a directory number (DN).

5. A method for optimizing home location register (HLR) queries in a wireless communication system in accordance with claim 4, wherein the step of determining if the mobile station is in the responding HLR comprises determining that the DN is unassigned.

6. A method for optimizing home location register (HLR) queries in a wireless communication system in accordance with claim 4, further comprising, if all HLRs respond with an unassigned DN, playing an announcement to the caller and ending the call attempt.

7. A method for optimizing home location register (HLR) queries in a wireless communication system in accordance with claim 1, further comprising, if a timeout timer expires, playing an announcement to a caller and ending an associated call attempt.

8. A method for optimizing home location register (HLR) queries in a wireless communication system in accordance with claim 1, further comprising completing the call to the mobile station in the responding HLR.

* * * * *